W. DILLER.
Axle-Box.
No. 19,551.
Patented Mar. 9, 1858.
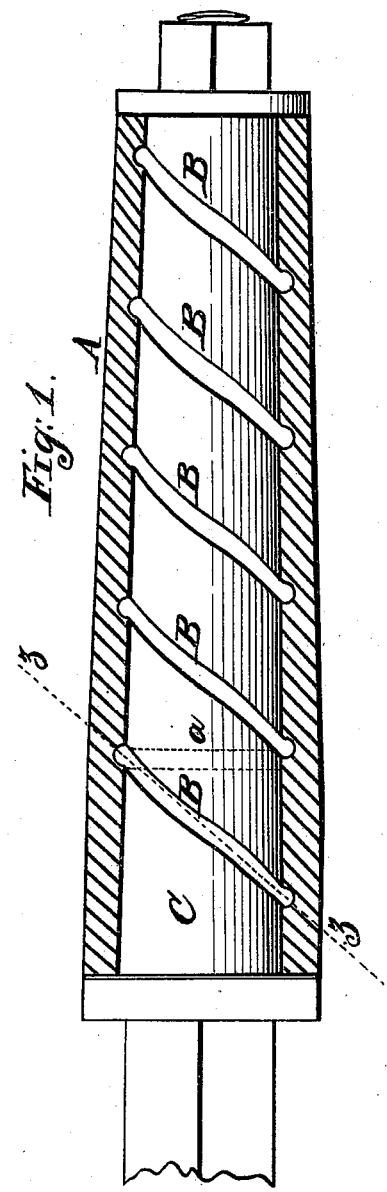
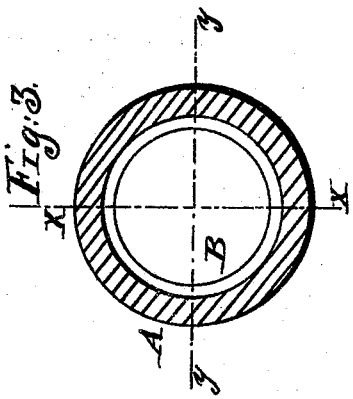
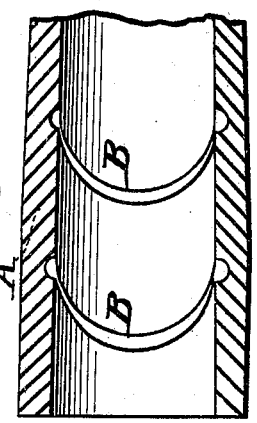

UNITED STATES PATENT OFFICE.

WILLIAM DILLER, OF LANCASTER, PENNSYLVANIA.

LUBRICATING THE AXLE-BOXES OF CARRIAGE-WHEELS.

Specification of Letters Patent No. 19,551, dated March 9, 1858.

*To all whom it may concern:*

Be it known that I, WILLIAM DILLER, of Lancaster, in the county of Lancaster and State of Pennsylvania, have invented a new and useful Improvement in Axle-Boxes for the Hubs of Wheels; and I do hereby declare that the following is a full, clear, and exact description of the same, reference being had to the annexed drawings, making a part of this specification, in which—

Figure 1, is a longitudinal section of my improvement taken in the line (*x*) (*x*) Fig. 3. Fig. 2, is a section of a portion of ditto taken in the line (*y*) (*y*) Fig. 3. Fig. 3, is a transverse section of ditto taken in the line (*z*), (*z*), Fig. 1.

Similar letters of reference indicate corresponding parts in the several figures.

This invention consists in having a series of oblique or inclined grooves formed in the inner side of the box, the grooves extending entirely around the inner surface of the box and placed at such distances apart that the portion of the arm of the axle around which one groove will pass over as the box rotates, will adjoin or nearly adjoin the portion of the arm around which its adjoining grooves will pass over. These grooves are made of a requisite depth and breadth and form oil chambers for the perfect lubrication of the arm without diminishing in any appreciable degree the bearing surface of the box.

To enable those skilled in the art to fully understand and construct my invention I will proceed to describe it.

A represents an axle box which externally is of the usual form. The box is made of the usual material, cast metal, with its inner surface chilled or otherwise as may be desired. Within the box A, a series of grooves B, are made. These grooves extend entirely around the inner surface of the box and are inclined or have oblique positions as shown clearly in Fig. 1. Any number of grooves may be used corresponding of course to their inclination and the length of the box. The grooves may be of any suitable depth and width and they are so arranged that the edge of one groove at one side of the box will nearly if not quite reach the edge of the adjoining groove at the opposite side of the box, see Fig. 1, in which this is clearly shown by the dotted lines (*a*). As each groove extends entirely around the box and as the base or inner diameter is of slightly taper form the grooves being inclined will of course be of slightly elliptical form. The grooves B are formed by having corresponding projections placed on the cone, and when the casting is made and the cone withdrawn, the grooves may be planished or cleaned out and regularly formed by a proper tool and the inner surface of the box also bored, reamed, or smoothed by any proper means.

When the arm C, shown in red is lubricated the lubricating material will collect in the grooves B, said grooves forming oil chambers and as the box rotates the whole surface of the arm is brought in contact with the lubricating material the perfect lubrication being somewhat assisted by the slight longitudinal play of the box. At the same time it will be seen that the bearing surface of the box is not materially diminished by the grooves as the entire length of the arm rests on the entire length of the box and consequently the wear is distributed over the entire length of the box and arm. The arm and box therefore will be less affected by wear than in those cases where recesses are made circumferentially in the box at its center to receive the lubricating material thereby diminishing the bearing of the box and rendering both the box and arm more susceptible of wear.

I am aware that spiral grooves have been made in the arms of axles, and also I believe in the boxes, in order to feed the lubricating material along from one end of the box to the other to perfectly lubricate the arm. The difficulty attending this plan is that the lubricating material being subjected to this spiral movement, centrifugal force is in a measure destroyed and grit, sand and other foreign substances which may work within the box are liable to be worked up and mixed with the lubricating material forming, shortly after being applied, an abrasive rather than a lubricating compound. In my improvement the lubricating material within the grooves being merely moved around with the box all heavy foreign substances such as grit, sand, &c., which may work within the box, will, owing to centrifugal force pass into the grooves to their bottoms and be kept free from the arm.

Having thus described my invention what I claim as new and desire to secure by Letters Patent, is,

The oblique or inclined grooves or oil chambers B, formed within the axle box A, substantially as and for the purpose set forth.

WILLIAM DILLER.

Witnesses:
J. C. VAN CAMP,
M. M. ST. NEFF.